Patented Oct. 4, 1927.

1,644,250

UNITED STATES PATENT OFFICE.

BERTRAM HART, OF MANCHESTER, ENGLAND.

MANUFACTURE OF FERRIC SULPHATE.

No Drawing. Application filed October 18, 1926, Serial No. 142,528, and in Great Britain June 12, 1926.

This invention relates to the manufacture of ferric sulphate or persulphate of iron for use as an active material in the purification of benzol, petrol (gasolene) and like oils and spirits and also natural animal and vegetable oils and fats by the removal therefrom of sulphurous, resinous, odoriferous or other undesirable constituents.

The object of my invention is to provide a process which will produce the ferric sulphate in a condition suitable for use as aforesaid in an economical manner, and, if desired, from waste materials such as the waste oxidized iron borings resulting from the manufacture of aniline and which contain a high percentage of iron in the form of mixtures of ferrous and ferric oxides and hydrates.

In accordance with my invention, the ferrous and/or ferric oxides and/or hydrated oxides hereinafter termed iron oxides for convenience of reference are first treated with sufficient sulphuric acid of a strength proportioned in accordance with the moisture in the oxides, to render the iron contents soluble. In the case of the iron oxides resulting from the manufacture of aniline, the amount of sulphuric acid so required is about one-third of the amount required to convert the whole of the iron into persulphate $Fe_2(SO_4)_3$, plus sufficient sulphuric acid to neutralize any neutralizing agent, such as lime, which may be contained in the waste.

When the sulphuric acid is added as before referred to, an energetic and rapid reaction takes place and the mass assumes a treacly form. The remainder of the sulphuric acid necessary to convert the iron into persulphate is then added together with an oxidizing agent or agents, such as nitric acid, sodium nitrate or other nitrates, and manganese dioxide. In the case of sodium nitrate or other nitrates and manganese dioxide a sufficient excess of sulphuric acid over and above that required to form persulphate of iron is added to react completely with the oxidizing agents.

During the two stages of treatment, the mass is constantly agitated.

The second stage of the operation, not only forms the ferric sulphate but precipitates it from its semi-solution in a state of fine subdivision. The material is then dried off and can be ground to any desired degree of fineness.

By carrying out the reaction in two stages as before described, I am enabled to produce a material suitable for use as the active agent in the purification process before referred to. The mere addition of sufficient sulphuric acid to the iron oxides whilst it produces the persulphate of iron, yields a body which has not the required active properties so far as benzol, gasolene and like purification is concerned and which is in the form of solid lumps of a cohesive nature very difficult to grind and which when ground is less reactive for the purpose of this invention as opposed to the fine precipitate obtained by my process.

What I claim is:—

1. Process for the manufacture of ferric sulphate suitable for use as an active material in the purification of oils, spirits and fats, which consists in first treating iron oxides with only sufficient sulphuric acid to render the iron contents soluble and then adding sufficient sulphuric acid together with an oxidizing agent to produce ferric sulphate.

2. Process for the production of ferric sulphate suitable for use as an active material in the purification of oils, spirits and fats, which consists in treating the waste oxidized iron borings resulting from the manufacture of aniline with only sufficient sulphuric acid to render the iron contents soluble, and then adding sufficient sulphuric acid together with an oxidizing agent to produce ferric sulphate.

In testimony whereof I have signed my name to this specification.

BERTRAM HART.